United States Patent
Su et al.

(10) Patent No.: US 9,667,526 B2
(45) Date of Patent: May 30, 2017

(54) MOBILE TERMINAL

(71) Applicant: Spreadtrum Communications (Shanghai) Co., Ltd., Zhangjiang, Shanghai (CN)

(72) Inventors: Yu-Jen Su, Shanghai (CN); Wei-Hsin Lee, Shanghai (CN); Chia-Hsiang Su, Shanghai (CN); Pao-Ta Lin, Shanghai (CN); Tsung-Hsien Tsai, Shanghai (CN); Wen-Ni Cheng, Shanghai (CN)

(73) Assignee: SPREADTRUM COMMUNICATIONS (SHANGHAI) CO., LTD, Shanghai (CN)

( * ) Notice: Subject to any disclaimer, the term of this patent is extended or adjusted under 35 U.S.C. 154(b) by 61 days.

(21) Appl. No.: 14/661,497

(22) Filed: Mar. 18, 2015

(65) Prior Publication Data

US 2016/0094361 A1 Mar. 31, 2016

(30) Foreign Application Priority Data

Sep. 30, 2014 (CN) .......................... 2014 1 0522125

(51) Int. Cl.
*H04L 12/28* (2006.01)
*H04L 12/751* (2013.01)
*G06F 13/40* (2006.01)

(52) U.S. Cl.
CPC .......... *H04L 45/02* (2013.01); *G06F 13/4081* (2013.01); *G06F 2213/0016* (2013.01)

(58) Field of Classification Search
None
See application file for complete search history.

(56) References Cited

U.S. PATENT DOCUMENTS

| 7,340,284 B2* | 3/2008 | Chung | H04M 1/6058 379/420.04 |
| 2012/0328116 A1* | 12/2012 | Bidmead | H04R 29/004 381/59 |
| 2013/0148820 A1* | 6/2013 | Sagong | H04R 1/1041 381/74 |
| 2013/0223641 A1* | 8/2013 | Lin | H04M 1/72527 381/77 |

* cited by examiner

*Primary Examiner* — Minh-Trang Nguyen
(74) *Attorney, Agent, or Firm* — Cantor Colburn LLP

(57) ABSTRACT

A mobile terminal includes: a peripheral interface having four terminals; an I2C interface; a first detection unit adapted to detect if an I2C device is inserted into the peripheral interface; and a first control unit adapted to, when the first detection unit detects there is an I2C device inserted into the peripheral interface, connect the I2C interface with the peripheral interface, such that the I2C interface is connected with the detected I2C device plugged in the peripheral interface. Accordingly, information exchange between mobile terminals and I2C devices can be achieved, thus adaptability of the mobile terminals can be expanded.

8 Claims, 4 Drawing Sheets

MOBILE TERMINAL

CROSS-REFERENCE TO RELATED APPLICATIONS

The present invention claims priority under 35 U.S.C. §119 to Chinese patent application No. 201410522125.0, filed on Sep. 30, 2014, the entire content of which is incorporated herein by reference.

TECHNICAL FIELD

The present disclosure generally relates to communication technology, and more particularly, to a mobile terminal.

BACKGROUND

Mobile terminal devices, also known as mobile communication devices, refer to computer equipments that can be used when they are moving. For example, mobile phones, notebooks, tablet computers, POS devices, and vehicle mounted on-board computers all belong to mobile terminals. Along with the development of internet technology and integrated circuit technology, mobile terminal devices are progressing to handle complex information processing.

Usually, mobile terminal devices can communicate with external devices through interfaces such as WiFi, USB, Audio Jack, or Bluetooth. However, when there is no such interface, communication between a mobile terminal device and an external device is a problem.

SUMMARY

According to one embodiment of the present disclosure, a mobile terminal is provided, including: a peripheral interface having four terminals; an I2C interface; a first detection unit adapted to detect if an I2C device is inserted into the peripheral interface; and a first control unit adapted to, when the first detection unit detects there is an I2C device inserted into the peripheral interface, connect the I2C interface with the peripheral interface, such that the I2C interface is connected with the detected I2C device plugged in the peripheral interface.

In some embodiments, the mobile terminal further includes: a second detection device adapted to detect if the I2C device is plugged out from the peripheral interface; and a second control unit adapted to disconnect the I2C interface from the peripheral interface, when the second detection device detects that the I2C device is plugged out from the peripheral interface.

In some embodiments, the peripheral interface is an USB interface.

In some embodiments, the peripheral interface is a headset interface having a right channel terminal, a left channel terminal, a ground terminal, and a microphone terminal.

In some embodiments, the first detection includes: a headset impedance detection circuit having a first low dropout regulator and an impedance detection terminal; and wherein the impedance detection terminal is connected with the first low dropout regulator through a first resistor and a second resistor, and connected with the right channel terminal of the headset interface through the first resistor.

In some embodiments, wherein the I2C interface has a serial clock line and serial data line, and the first control unit includes: a first analog-digital converter, a second low dropout regulator and a first switch control unit:

wherein the right channel terminal of the headset interface is connected with the serial clock line of the I2C interface through a first switch;

wherein the left channel terminal of the headset interface is connected with the first analog-digital converter, connected with the serial data line of the I2C interface through a second switch, and connected with a common terminal of a first change-over switch in the I2C device;

wherein the ground terminal of the headset interface is connected with a normally closed terminal of the first change-over switch through a third resistor;

wherein the microphone terminal of the headset interface is connected with a normally opened terminal of the first change-over switch through a fourth resistor, connected with a first output terminal of the second low dropout regulator through a fifth resistor, a sixth resistor and a third switch; connected with an input terminal of the first change-over switch through a seventh switch, and connected with a voltage output terminal of the first change-over switch; and wherein when the I2C device is detected being inserted into the headset interface, the first switch control unit is adapted to: control the first switch to connect the serial clock line of the I2C interface and the right channel terminal of the headset interface, control the second switch to connect the serial data line of the I2C interface and the left channel terminal of the headset interface, and control the third switch to connect the low dropout regulator and the microphone terminal of the headset interface.

In some embodiments, the second detection unit includes: a second analog-digital converter which is connected with a second output terminal connecting the fifth resistor, the sixth resistor, the third switch and the low dropout regulator.

In some embodiments, when the I2C device is detected being plugged out from the headset interface, the second control unit is adapted to: control the first switch to disconnect the serial clock line of the I2C interface from the right channel terminal of the headset interface, control the second switch to disconnect the serial data line of the I2C interface from the left channel terminal of the headset interface, and control the third switch to disconnect the low dropout regulator from the microphone terminal of the headset interface.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

As recited in the background, configurations of existing mobile terminals can not enable communications and information exchanges between an external I2C (Inter-Integrated Circuit) device and the mobile terminals.

Furthermore, as serial bus interfaces, I2C interfaces are generally used for achieving communications among chips. For example, the I2C interfaces can be used for enabling communications among chips of a PCB (Printed Circuit Board). Similarly, the I2C interfaces also can be used for enabling communications among chips of a mobile terminal.

Accordingly, through connecting an I2C interface integrated in the mobile terminal and an I2C device, the mobile terminal can be connected with the I2C device. Thus, communications and information exchanges between the mobile terminal and the I2C device can be achieved.

Figure 1:
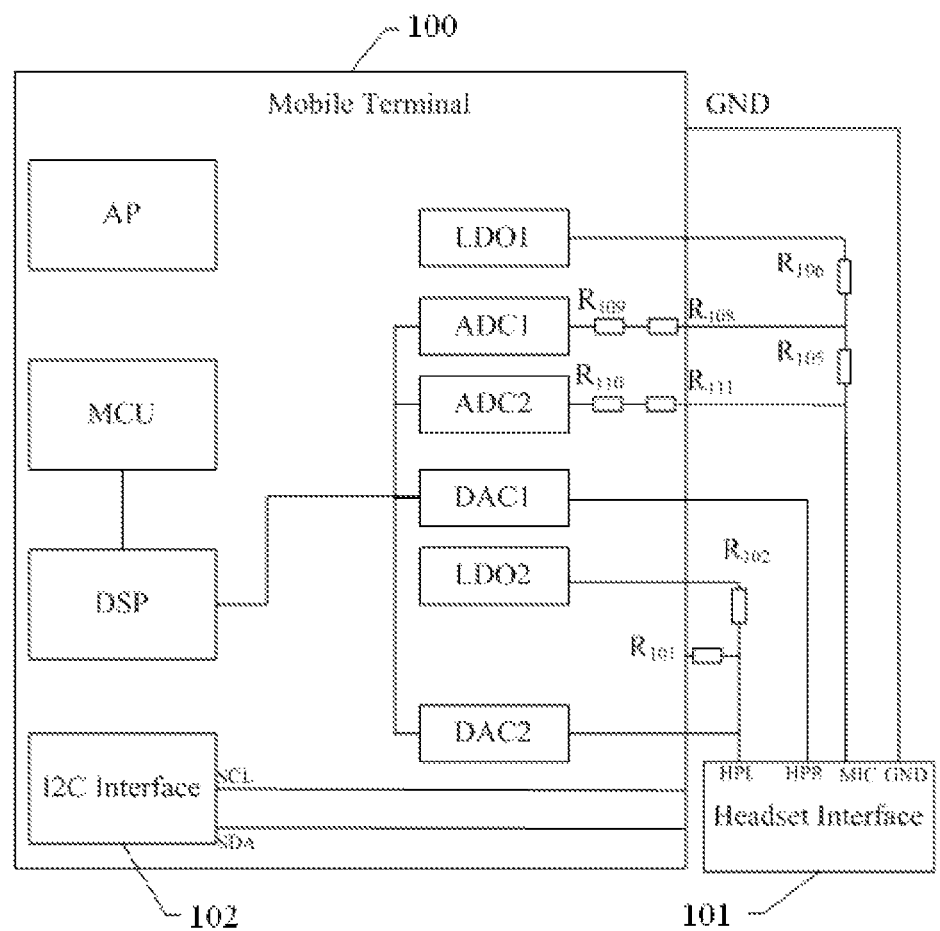
FIG. 1 schematically illustrates an existing structure of a mobile terminal.

Referring to FIG. 1, an existing mobile terminal is illustrated, including: a headset interface 101 and an I2C interface 102.

The headset interface 101 includes a right channel terminal HPR and a left channel terminal HPL. The right channel terminal HPR is connected with a first digital analog converter DAC1. The left channel terminal HPL is connected with a second digital analog converter DAC2. The left channel terminal HPL is further connected with an impedance detection terminal of a headset impedance detection circuit (not shown in FIG. 1) and a second low dropout regulator LDO2. The left channel terminal HPL is connected with the impedance detection terminal of the headset impedance detection circuit through a first resistor $R_{101}$, and the left channel terminal HPL is connected with the LDO2 through a second resistor $R_{102}$.

The headset interface 101 further includes a microphone terminal MIC which is connected with a first analog digital converter ADC1, with a second analog digital converter ADC2, and with a first low dropout regulator LDO1. The MIC of the headset interface 101 is connected with the first analog digital converter ADC1 through a fifth resistor $R_{105}$, an eight resistor $R_{108}$ and a ninth resistor $R_{109}$ The MIC of the headset interface 101 is connected with the second analog digital converter ADC2 through a tenth resistor $R_{110}$, and a eleventh resistor $R_{111}$. The MIC of the headset interface 101 is connected with the first low dropout regulator LDO1 through the fifth resistor $R_{105}$ and a sixth resistor $R_{106}$.

The headset interface 101 further includes a ground terminal GND which is grounded, that is, the ground terminal GND is connected with earth.

It should be noted that, signals generated by the first digital analog converter DAC1 and the second digital analog converter DAC2 may be sent to a signal process unit DSP and a micro-control unit MCU, thus the signals may be processed for specific functions.

Accordingly, when a headset is inserted into the headset interface 101, the headset impedance detection circuit will implement an impedance detection process for detecting impedance. Further, if the impedance detected by the headset impedance detection circuit is within a preset range, the headset will be taken as being inserted into the headset interface. In this case, the first low dropout regulator LDO1 can provide a power supply to the headset, thus the headset can be connected with the mobile terminal 100 and receive voice data from the mobile terminal 100.

Figure 2:
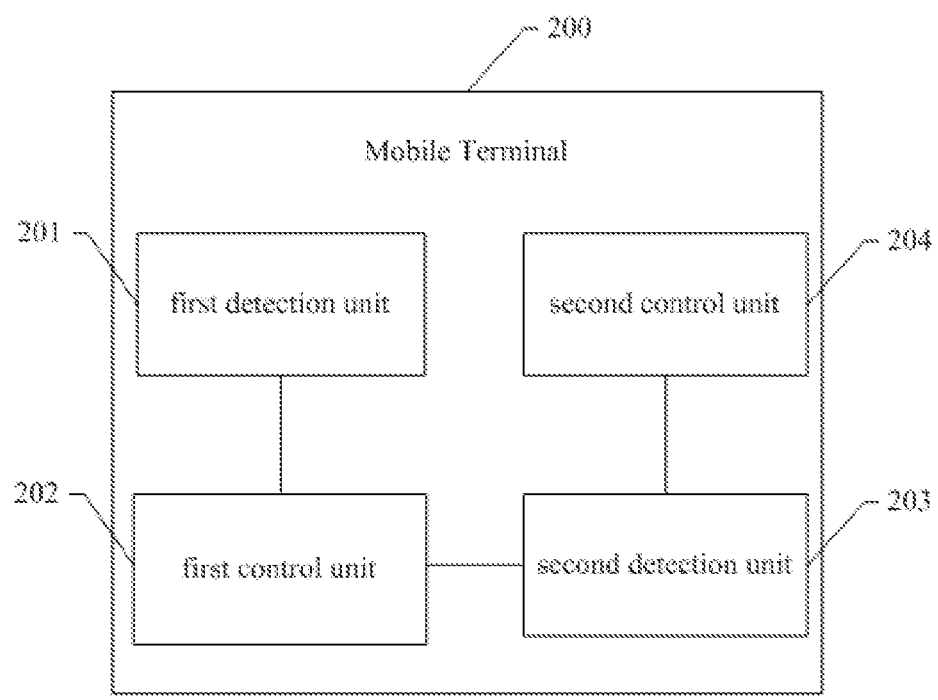
FIG. 2 schematically illustrates a frame structure of a mobile terminal according to one embodiment of the present disclosure.

Referring to FIG. 2, a mobile terminal 200 according to one embodiment of the present disclosure is illustrated, including: a first detection unit 201, a first control unit 202, a second detection unit 203, and a second control unit 204.

The first detection unit 201 is adapted to detect if an I2C device is inserted into a periphery interface of the mobile terminal.

In some embodiments, the periphery interface may be a USB interface. In some embodiments, the periphery interface may be a headset interface.

The first control unit 202 is adapted to connect an I2C interface of the mobile terminal with the I2C device, when the I2C device is detected being inserted into the periphery interface. In some embodiments, the first control unit 202 is adapted to connect the I2C interface with the peripheral interface, such that the I2C interface is connected with the I2C device.

The second detection unit 203 is adapted to detect if the I2C device is plugged out from the periphery interface.

The second control unit 204 is adapted to disconnect the I2C interface from the peripheral interface, when the second detection device detects that the I2C device is plugged out from the peripheral interface.

Figure 3:
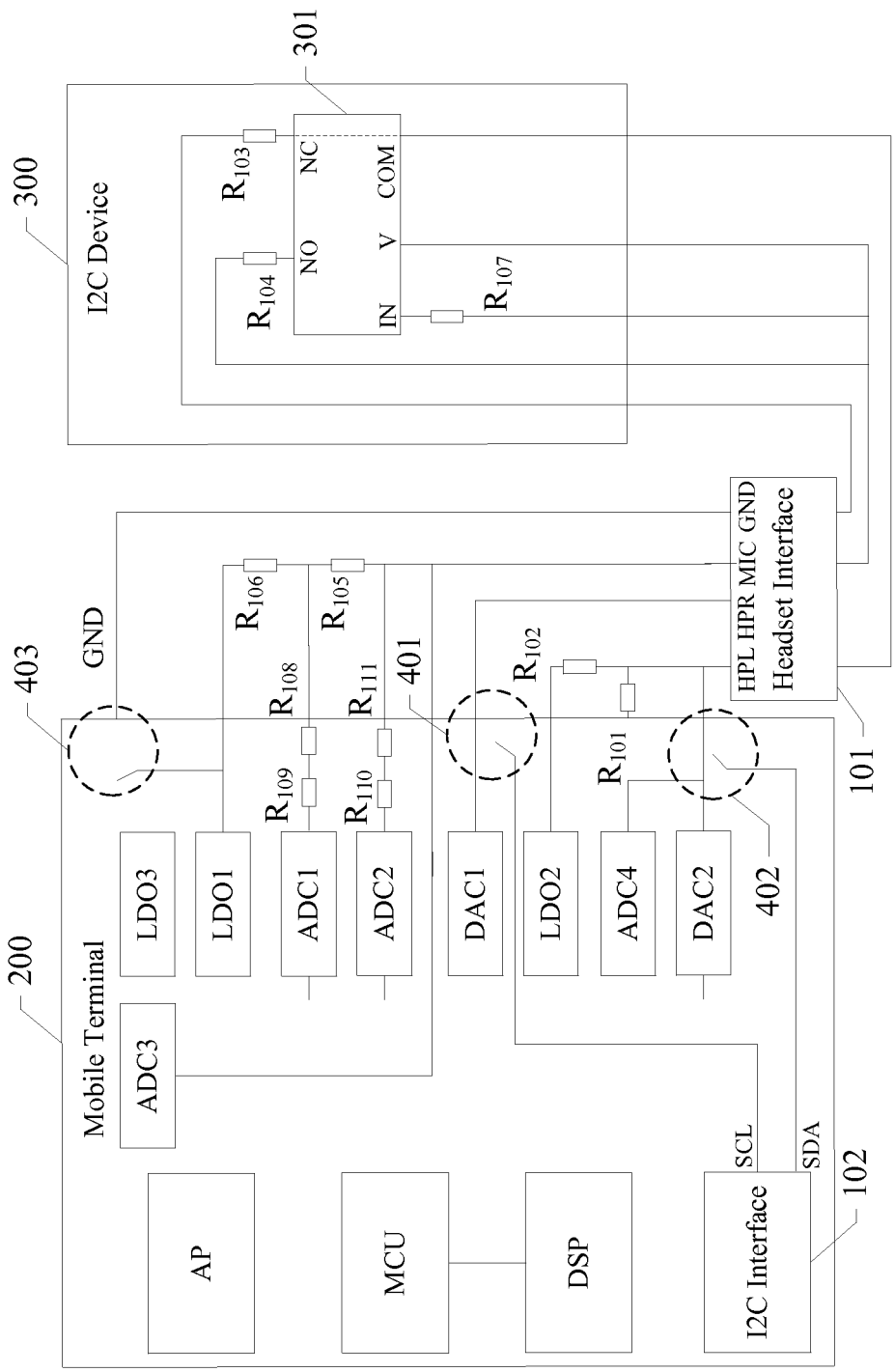
FIG. 3 schematically illustrates a structure of a mobile terminal before an I2C device is inserted into the mobile terminal according to one embodiment of the present disclosure.

Referring to FIG. 2 and FIG. 3, the periphery interface is the headset interface 101, and the first detection unit 201 includes a headset impedance detection circuit (not shown in FIG. 2 and FIG. 3). The headset impedance detection circuit having an impedance detection terminal which is connected with a first end of a first resistor $R_{101}$. The first resistor $R_{101}$ further has a second end connected with a third end of a second resistor $R_{102}$ and connected with the right channel terminal HPR of the headset interface 101, wherein the second resistor $R_{102}$ has a fourth end connected with a second low dropout regulator LDO2.

In some embodiments, the first control unit 202 may include: a fourth analog-digital converter ADC4, a third low dropout regulator LDO3, and a first switch controller (not shown in FIG. 2 and FIG. 3).

The fourth analog-digital converter ADC4 is connected with the left channel terminal HPL of the headset interface 101. The left channel terminal HPL is connected with the serial data line SDA of the I2C interface through a second switch 402. The left channel terminal HPL is also connected with a common terminal COM of a first change-over switch 301 of the I2C device 300.

A serial clock line SCL of the I2C interface is connected with the right channel terminal HPR of the headset interface 101 through a first switch 401. In other words, the first switch 401 can be used for connecting or disconnecting between the serial clock line SCL of the I2C interface and the right channel terminal HPR of the headset interface 101.

The first change-over switch 301 includes a normally closed contact terminal NC and a normally opened contact terminal NO. The normally closed contact terminal NC is connected with the ground terminal GND of the headset interface 101 through a third resistor R103, where the ground terminal GND is grounded. The normally opened contact terminal NO is connected with the microphone terminal MIC of the headset interface 101 through a fourth resistor $R_{104}$.

The microphone terminal MIC is connected with an output terminal of a third low dropout regulator LDO3 through a fifth resistor $R_{105}$, a sixth resistor $R_{106}$, and a third switch 403. The microphone terminal MIC is also connected with a signal input terminal IN and a voltage input terminal V of the first change-over switch 301, where the microphone terminal MIC is connected with the signal input terminal IN through a seventh resistor $R_{107}$.

The first switch controller is adapted to: when the I2C device 300 is inserted into the headset interface 101, connect the serial clock line SCL of the I2C interface 102 with the right channel terminal HPR of the headset interface 101 through the first switch 401, connect the serial data line SDA of the I2C interface 102 with the left channel terminal HPL of the headset interface 101 through the second switch 402, and connect the microphone terminal MIC of the headset interface 101 with the third low dropout regulator LDO3 through the third switch 403.

Accordingly, the first switch controller is used for controlling the first switch 401, the second switch 402 and the third switch 403. In some embodiments, the first switch controller may be integrated into the micro control unit (MCU).

In some embodiments, the second detection unit 203 may include: a third analog-digital converter ADC3 connected with an output terminal which connects the fifth resistor $R_{105}$, the sixth resistor $R_{106}$, the third switch 403 and the third low dropout regulator LDO3.

In some embodiments, the second control unit 204 may be adapted to: when the I2C device 300 is plugged out from the headset interface 101, disconnect between the serial clock line SCL of the I2C interface 102 and the right channel terminal HPR of the headset interface 101 through the first switch 401, disconnect between the serial data line SDA of the I2C interface 102 and the left channel terminal HPL of the headset interface 101 through the second switch 402, and disconnect between the microphone terminal MIC of the headset interface 101 and the third low dropout regulator LDO3 through the third switch 403.

Accordingly, in comparison with the existing structure of the mobile terminal shown in FIG. 2, the mobile terminal 200 illustrated in FIG. 3 further includes the fourth analog-digital converter ADC4, the third analog-digital converter ADC3 and the third low dropout regulator LDO3. Furthermore, some modifications have been made to connections among components thereof.

As the I2C interface 102 in the mobile terminal 200 is used for information transmissions among chips in the mobile terminal 200, the serial clock line SCL and the serial data line SDA of the I2C interface are always in high level. However, in order to establish a connection between the mobile terminal 200 and the I2C device 300 when the I2C device is inserted into the headset interface 101, the serial data line SDA should be pulled down to low level first.

Accordingly, in some embodiments, the change-over switch 301 is set in the I2C device 300, so as to pull the serial data line SDA down to the low level. Specifically, the serial data line SDA of the I2C interface 102 is connected to the common terminal COM of the first change-over switch 301 through the left channel terminal HPL, the common terminal COM is connected to the normally closed contact terminal NC of the first change-over switch 301, and the normally closed contact terminal NC is connected to the ground terminal GND which is grounded through the third resistor $R_{103}$. Thus, impedance between the serial data line SDA of the I2C interface 102 and the ground can be confined within a preset range, such as 2Kohm, by controlling the third resistor $R_{103}$. Therefore, when there is no accessory, such as a headset or an I2C device, inserted into the headset interface 101, the serial data line SDA is able to be pulled down to the low level.

When there is no accessory inserted into the headset interface 101, the impedance detection terminal (HP detection) of the headset impedance detection circuit will maintained in the high level because of the second low dropout regulator LDO2. Furthermore, the impedance detection terminal of the headset impedance detection circuit will not receive any interrupt signal, thus no power supply is applied to the first low dropout regulator LDO1 and the third low dropout regulator LDO3. The third analog-digital convertor ADC3 and the fourth analog-digital convertor ADC4 are in idle.

When there is an accessory inserted into the headset interface 101, impedance of the left channel terminal HPL of the headset interface 101 will be in a preset value, such as 32 ohm (or between 6.8 ohm to 600 ohm), or 2Kohm. Therefore, the impedance detection terminal of the headset impedance detection circuit will receive an interrupt signal, where the interrupt signal can be used for determining if there is an accessory inserted into the headset interface 101.

Further, when an accessory is detected being inserted into the headset interface 101, the fourth analog-digital convertor ADC4 will start to detect impedance of the right channel terminal (or the SCL) of the headset interface 101, so as to determined which accessory is inserted into the headset interface 101.

Specifically, when the second impedance detected is smaller than a preset impedance threshold, such as smaller than 1Kohm, the accessory inserted into the headset interface 101 may be determined as being a headset. When the second impedance detected is larger than a preset threshold, such as larger than 1Kohm, the accessory inserted into the headset interface 101 may be determined as being an I2C device.

In some embodiments, when the accessory is determined as being the headset, the first low dropout regulator LDO1 may be used for providing a power supply to the headset.

Figure 4:
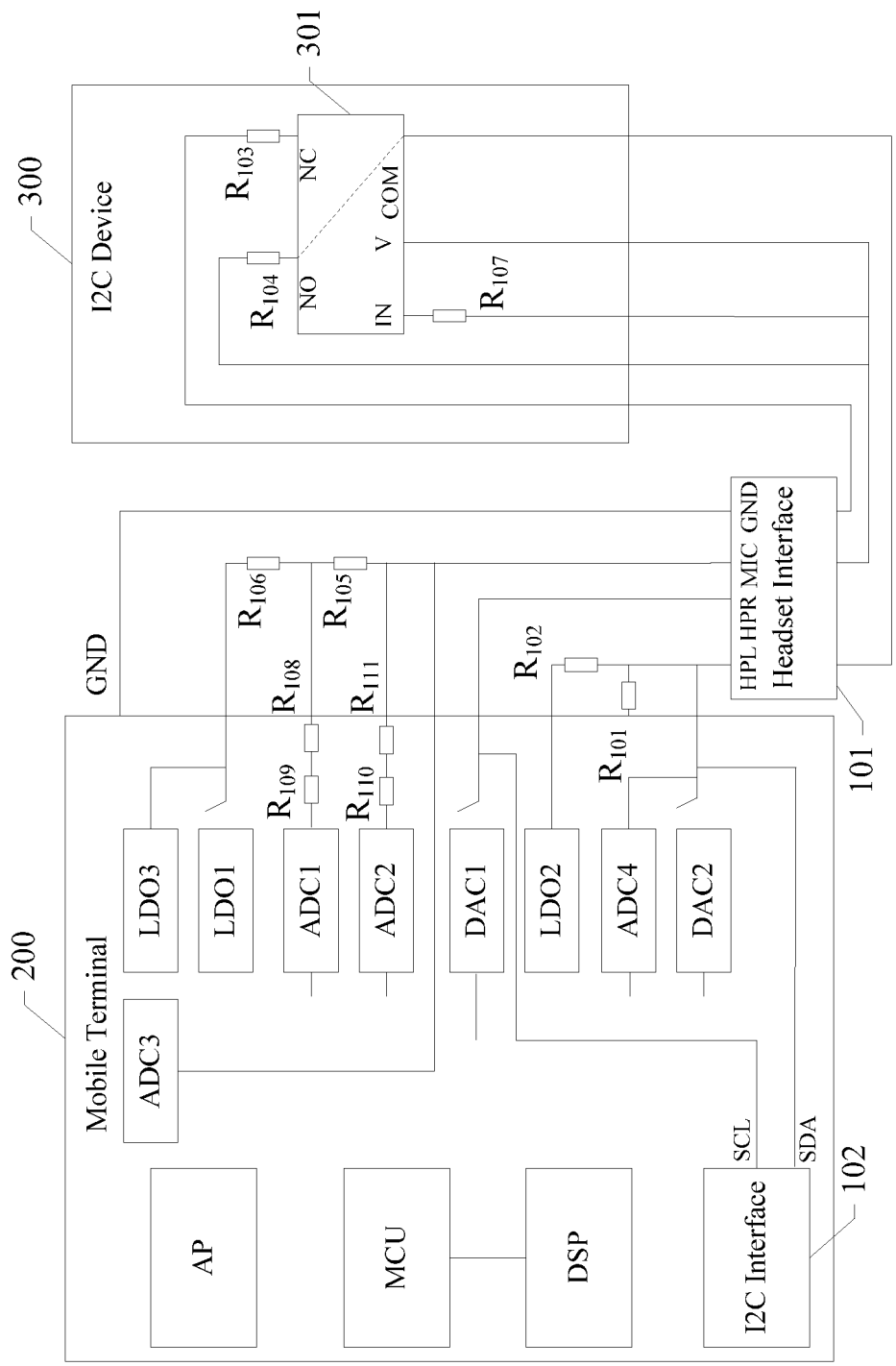
FIG. 4 schematically illustrates a structure of a mobile terminal after an I2C device is inserted into the mobile terminal according to one embodiment of the present disclosure.

In some embodiments, when the accessory is determined as being the I2C device, connections among components of the mobile terminal and the first change-over switch 301 illustrated in FIG. 3 will change into connections illustrated in FIG. 4.

Referring to FIG. 4, the third low dropout regulator LDO3 is enabled, thus a voltage input into the voltage input terminal V of the first change-over switch will change from low level to high level. Therefore, the common terminal COM of the first change-over switch will be connected with the normally opened contact terminal NC. Accordingly, the serial data line SDA of the I2C interface will be pulled up.

As the impedance detection terminal of the headset impedance detection circuit is connected with the serial data line SDA of the I2C interface 102, interrupt signal generated because of electrical level change of the serial data line SDA will reach the impedance detection circuit and cause the impedance detection circuit to make a wrong determination. Specifically, impedance detection circuit determines if the I2C device is inserted into the headset interface by detecting the interrupt signal. Thus, interrupt signal generated because of electrical level change of the serial data line SDA in this condition should be masked by way of software, so as to avoid false operation.

After the I2C device is determined being inserted into the headset interface 101, the third analog-digital converter ADC3 will continuously detect current output from the third low dropout regulator LDO3. When the current detected by the third analog-digital converter ADC3 is smaller than a preset current threshold, the I2C device 300 will be determined as being plugged out from the headset interface 101. Then, the third analog-digital converter ADC3 will stop detecting the current output from the third low dropout regulator LDO3.

It should be noted that, the headset interface 101 is only an example for illustrating the process for connecting the mobile terminal 200 and the I2C device. The method recited is also able to be applied by other interfaces having four terminals, such as USB interfaces and audio jack interfaces, to connect a mobile terminal to an I2C device through an I2C interface in the mobile terminal, as such the mobile terminal and the I2C device are able to exchange information with each other.

Furthermore, information exchange between the mobile terminal and the I2C device may be achieved by software. Thus, an open interface for implementing a read operation or a write operation to the I2C interface may be adapted, so as to allow I2C device developers or APP developers developing different applications to control the I2C device.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A mobile terminal, comprising:
    a peripheral interface having four terminals;
    an I2C interface;
    a first detection unit adapted to detect if an I2C device is inserted into the peripheral interface; and
    a first control unit adapted to, when the first detection unit detects there is an I2C device inserted into the peripheral interface, connect the I2C interface with the peripheral interface, such that the I2C interface is connected with the detected I2C device plugged in the peripheral interface.

2. The mobile terminal according to claim 1, further comprising:
    a second detection device adapted to detect if the I2C device is plugged out from the peripheral interface; and
    a second control unit adapted to disconnect the I2C interface from the peripheral interface, when the second detection device detects that the I2C device is plugged out from the peripheral interface.

3. The mobile terminal according to claim 1, wherein the peripheral interface is an USB interface.

4. The mobile terminal according to claim 1, wherein the peripheral interface is a headset interface having a right channel terminal, a left channel terminal, a ground terminal, and a microphone terminal.

5. The mobile terminal according to claim 4, wherein the first detection unit comprises a headset impedance detection circuit having a first low dropout regulator and an impedance detection terminal; and
    wherein the impedance detection terminal is connected with the first low dropout regulator through a first resistor and a second resistor, and connected with the right channel terminal of the headset interface through the first resistor.

6. The mobile terminal according to claim 5, wherein the I2C interface has a serial clock line and serial data line, and the first control unit comprises: a first analog-digital converter, a second low dropout regulator and a first switch control unit;
    wherein the right channel terminal of the headset interface is connected with the serial clock line of the I2C interface through a first switch;
    wherein the left channel terminal of the headset interface is connected with the first analog-digital converter, connected with the serial data line of the I2C interface through a second switch, and connected with a common terminal of a first change-over switch in the I2C device;
    wherein the ground terminal of the headset interface is connected with a normally closed terminal of the first change-over switch through a third resistor;
    wherein the microphone terminal of the headset interface is connected with a normally opened terminal of the first change-over switch through a fourth resistor, connected with a first output terminal of the second low dropout regulator through a fifth resistor, a sixth resistor and a third switch; connected with an input terminal of the first change-over switch through a seventh switch, and connected with a voltage output terminal of the first change-over switch; and
    wherein when the I2C device is detected being inserted into the headset interface, the first switch control unit is adapted to: control the first switch to connect the serial clock line of the I2C interface and the right channel terminal of the headset interface, control the second switch to connect the serial data line of the I2C interface and the left channel terminal of the headset interface, and control the third switch to connect the low dropout regulator and the microphone terminal of the headset interface.

7. The mobile terminal according to claim 6, wherein the second detection unit comprises: a second analog-digital converter which is connected with a second output terminal connecting the fifth resistor, the sixth resistor, the third switch and the low dropout regulator.

8. The mobile terminal according to claim 7, wherein the second control unit is adapted to: when the I2C device is detected being plugged out from the headset interface, control the first switch to disconnect the serial clock line of the I2C interface from the right channel terminal of the headset interface, control the second switch to disconnect the serial data line of the I2C interface from the left channel terminal of the headset interface, and control the third switch to disconnect the low dropout regulator from the microphone terminal of the headset interface.

* * * * *